United States Patent
Malik et al.

(10) Patent No.: US 8,954,962 B2
(45) Date of Patent: Feb. 10, 2015

(54) AUTOMATICALLY RECONFIGURING PHYSICAL SWITCHES TO BE IN SYNCHRONIZATION WITH CHANGES MADE TO ASSOCIATED VIRTUAL SYSTEM

(75) Inventors: Bilal Malik, Campbell, CA (US); Arthi Ayyangar, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 778 days.

(21) Appl. No.: 13/192,025

(22) Filed: Jul. 27, 2011

(65) Prior Publication Data

US 2012/0072909 A1 Mar. 22, 2012

Related U.S. Application Data

(60) Provisional application No. 61/385,482, filed on Sep. 22, 2010.

(51) Int. Cl.
*G06F 9/455* (2006.01)
*H04L 12/46* (2006.01)

(52) U.S. Cl.
CPC ........ *G06F 9/45558* (2013.01); *H04L 12/4641* (2013.01); *G06F 2009/45595* (2013.01)
USPC ............................................................ 718/1

(58) Field of Classification Search
CPC .................. G06F 2009/45595; G06F 9/45558; H04L 12/4641
See application file for complete search history.

(56) References Cited

U.S. PATENT DOCUMENTS

| 8,385,202 | B2* | 2/2013 | Kuik et al. | 370/235 |
| 8,619,771 | B2* | 12/2013 | Lambeth et al. | 370/389 |
| 2005/0120160 | A1* | 6/2005 | Plouffe et al. | 711/1 |
| 2011/0299402 | A1* | 12/2011 | Vobbilisetty et al. | 370/241 |
| 2011/0299413 | A1* | 12/2011 | Chatwani et al. | 370/252 |
| 2012/0227041 | A1* | 9/2012 | Lambeth et al. | 718/1 |

* cited by examiner

*Primary Examiner* — Meng An
*Assistant Examiner* — James J Lee
(74) *Attorney, Agent, or Firm* — Harrity & Harrity, LLP

(57) ABSTRACT

Changes to a virtual system, such as a set of virtual machines in a data center, may be automatically synchronized with the corresponding physical system. In one implementation, an application may receive information regarding changes made to a virtual system. The application may determine whether the information regarding the changes necessitates a change in the configuration of one or more physical switches, and may reconfigure affected ones of the physical switches for compatibility with the changes made to the virtual system.

22 Claims, 9 Drawing Sheets

AUTOMATICALLY RECONFIGURING PHYSICAL SWITCHES TO BE IN SYNCHRONIZATION WITH CHANGES MADE TO ASSOCIATED VIRTUAL SYSTEM

RELATED APPLICATION

This application claims priority to U.S. Provisional Patent Application No. 61/385,482, filed Sep. 22, 2010, the disclosure of which is incorporated by reference herein in its entirety.

BACKGROUND

A virtual machine (VM) is a software implementation of a machine (i.e. a computer) that executes programs like a physical computer. Software running inside a virtual machine may be limited to the resources and abstractions provided by the virtual machine. Virtualization may allow the sharing of the underlying physical resource between different virtual machines. With virtual machines, multiple operating system (OS) environments, each a VM, can co-exist on the same physical host machine.

One common application of virtual machines is in data centers. Data centers may include facilities to house computer systems and associated components, such as telecommunications and storage systems. Virtual machines may be used in data centers to help manage the use of the data center hardware. For example, instead of dedicating each data center server to a single physical host device, the data center servers may be implemented as virtual machines in which multiple virtual machines are run on a single physical host device. As the computing demands of the data center changes, virtual machines can be dynamically added, removed, or moved between physical hosts.

SUMMARY

One implementation is directed to a method that may include receiving information regarding changes made to a virtual system, the virtual system including one or more virtual machines that run on one or more physical devices, the physical devices being coupled to one another using one or more physical switches. The method may further include determining whether the information regarding the changes necessitates a change in the configuration of the one or more physical switches; and reconfiguring, when the information regarding the changes necessitates a change in the configuration of the one or more physical switches, affected ones of the one or more physical switches for compatibility with the changes made to the virtual system.

Another implementation is directed to a device that may include a processor and a memory. The memory may store instructions for execution by the processor, the instructions including instructions to receive information regarding changes made to a virtual system, the virtual system including one or more virtual machines that run on one or more physical devices, the physical devices being coupled to one another using one or more physical switches. The instructions may further include instructions to determine whether the information regarding the changes necessitates a change in the configuration of the one or more physical switches; and instructions to reconfigure, when the information regarding the changes necessitates a change in the configuration of the one or more physical switches, affected ones of the one or more physical switches for compatibility with the changes made to the virtual system.

Another implementation is directed to a number of servers, each of the servers to host one or more virtual machines; switches to couple the servers to an external network; a virtual machine control component to provision and manage the virtual machines, the virtual machine control component to transmit information regarding changes made to the virtual machines; and a network control component to manage the servers and switches, the network control component to receive the information regarding the changes made to the virtual machines, and in response, to determine whether the information regarding the changes necessitates a change in the configuration of the one or more of the switches, and, when the information regarding the changes necessitates a change, reconfiguring affected ones of the one or more switches for compatibility with the changes made to the virtual machines.

BRIEF DESCRIPTION OF THE DRAWINGS

The accompanying drawings, which are incorporated in and constitute a part of this specification, illustrate one or more implementations described here and, together with the description, explain these implementations. In the drawings.

DETAILED DESCRIPTION

The following detailed description of the invention refers to the accompanying drawings. The same reference numbers in different drawings may identify the same or similar elements.

Virtual machines (VMs), which may run on a number of physical hosts, may be managed from a single interface. Changes to the configurations of the VMs may be automatically propagated to the underlying physical hardware that is used to support the VMs. In one implementation, changes to a VM, such as moving a VM to a different physical host, may require configuration changes in a switch in the data center. The configuration changes may be automatically made to the switch.

Figure 1:
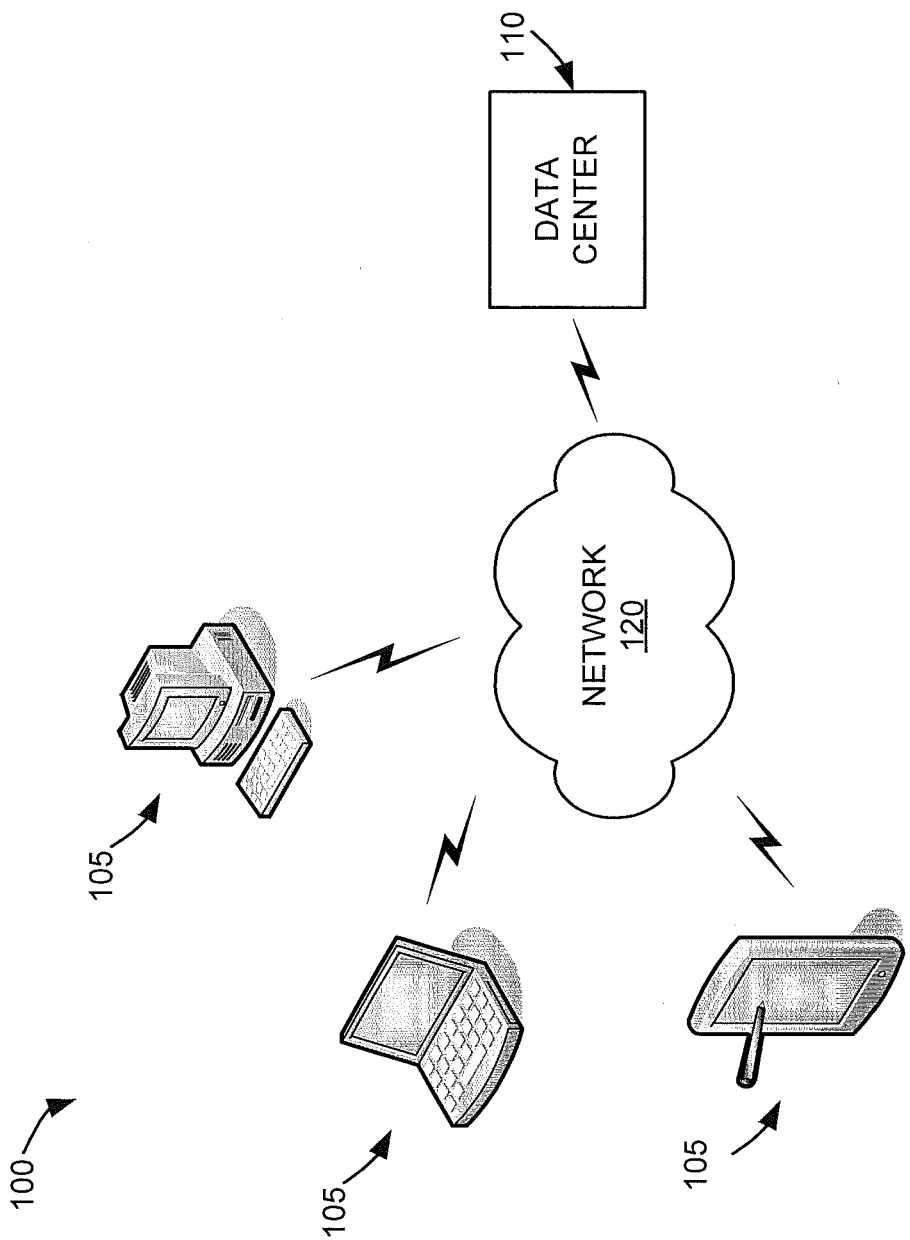
FIG. 1 is a diagram of an example environment in which systems and/or methods described herein may be implemented.

FIG. 1 is a diagram of an example environment 100 in which systems and/or methods described herein may be implemented. Environment 100 may include multiple clients 105 that can connect to a data center 110 via a network 120. Three clients 105 and one data center 110 are illustrated as connected to network 120 for simplicity. In practice, there may be more or fewer clients and/or data centers.

Clients 105 may include a computing device, such as a personal computer, a wireless telephone, a personal digital assistant (PDA), smart phone, a laptop, a tablet computer, or another type of computation or communication device. Clients 105 may use services provided, through network 120, by data center 110. In one implementation, the services provided by data center 110 may be services in which a user of a client 105 may control or interact with the service, such as a web server that provides web pages that are directly viewable by users of clients 105. In another implementation, the services provided by data center 110 may be services designed to be used by other applications, such as business applications running on clients 105.

Data center 110 may include one or more network devices, computing devices, and/or storage devices that collectively provide services to clients 105. For example, data center 110 may include web servers and database servers. Although shown as a single block in FIG. 1, each data center 110 may be associated with a number of network devices, computing devices, and/or storage devices. In some implementations, a data center 110 may be geographically distributed.

Network 120 may include any type of network, such as a local area network (LAN), a wide area network (WAN), a telephone network (e.g., the Public Switched Telephone Network (PSTN) or a cellular network), an intranet, the Internet, or a combination of networks. Clients 105 and data center 110 may connect to network 120 via wired and/or wireless connections.

Although FIG. 1 illustrates example components of environment 100, in other implementations, environment 100 may include additional, fewer, different, or differently arranged components than those illustrated in FIG. 1 and described herein. Alternatively, or additionally, one or more of the components shown in FIG. 1 may perform functions described as being performed by other of the components shown in FIG. 1.

Figure 2:
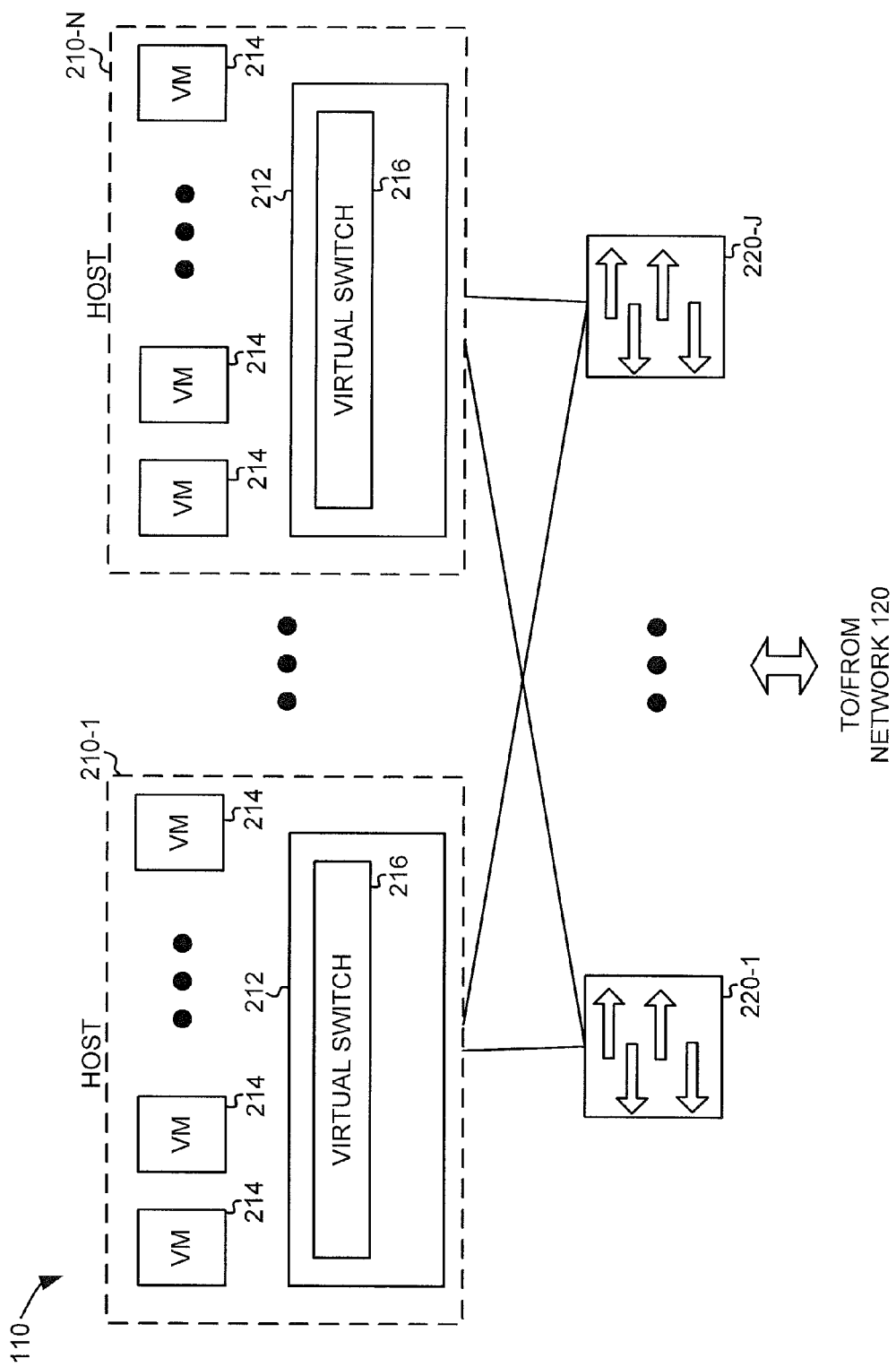
FIG. 2 is a diagram illustrating an example implementation of a data center.

FIG. 2 is a diagram illustrating an example implementation of data center 110. Data center 110 may include a number of hosts 210-1 through 210-N (referred to herein collectively as "hosts 210" or generically as "host 210") and a number of switches 220-1 through 220-J (referred to herein collectively as "switches 110" or generically as "switch 110").

Hosts 210 may include the physical computing devices upon which VMs are executed. Hosts 210 may include, for example, server computers, such as computers that include a general purpose processor, memory, application specific circuits, and/or other components. In one implementation, data center 110 may include a large number of hosts (e.g., N>100) mounted in a space efficient frame (a "rack").

Each host 210 may implement a number of software components. As shown, each host may include a hypervisor 212 and one or more VMs 214. Hypervisor 212, which may also be called a virtual machine manager, may run directly on the hardware of host 210 and may present a virtual operating platform to VMs 214. Hypervisor 212 may allow multiple VMs 214, potentially including VMs based on different operating systems, to run concurrently on a single host 210.

A host 210 may also include a virtual switch 216, which may be implemented by or within hypervisor 212. Virtual switch 216 may include a switch, implemented in software, that may act much like a physical switch. Virtual switch 216 may include multiple virtual ports, each of which can be connected to a single VM or to a physical switch, such as one of switches 220. The connections to a physical switch 220 may be through physical adapters, such as an Ethernet adapter. Multiple switches, such as either virtual switches 216 or physical switches 220, may be connected together to form a network, such as a local area network within data center 110.

VMs 214 may each include a software implementation of a computing system. Each VM 214 may include, for example, an operating system that executes on the abstract hardware system presented by hypervisor 212. VMs 214 may execute independently of one another. Each VM 214 may be limited to the resources presented by hypervisor 212 to the VM 214.

As one example, a single host 210 may include a number of executing VMs, such as operating system instances that run database servers, operating system instances that run web servers, and operating system instances that run email servers. Each VM instance 214 may be paused, re-started, terminated, or moved between hosts 210, as controlled by a system administrator communicating with hypervisors 212 of hosts 210.

Switches 220 may each include network devices that process and forward data. Switches 220 may include, for example, devices that process and route data at the data link (layer 2) layer of the Open Systems Interconnection (OSI) model. Alternatively, switches 220 may include devices that process data at the network layer (layer 3) of the OSI model, or multilayer switches that process data at both layer 2 and layer 3. In some implementations, switches 220 may include passive elements such as hubs or repeaters.

Switches 220 may each be configurable to implement various functions and/or network policy objectives. As an example, traffic may be assigned to different virtual local area networks (VLANs). Switches 220 may be configured as to how traffic belonging to certain VLANs should be handled (e.g., traffic in a certain VLAN received at one port may be switched to a second port). Additionally, before switch 220 may accept traffic from a VLAN, switch 220 may need to be configured to accept the VLAN traffic. As another example, switches 220 may include configurable options relating to traffic quality of service (QoS) or security.

Figure 3:
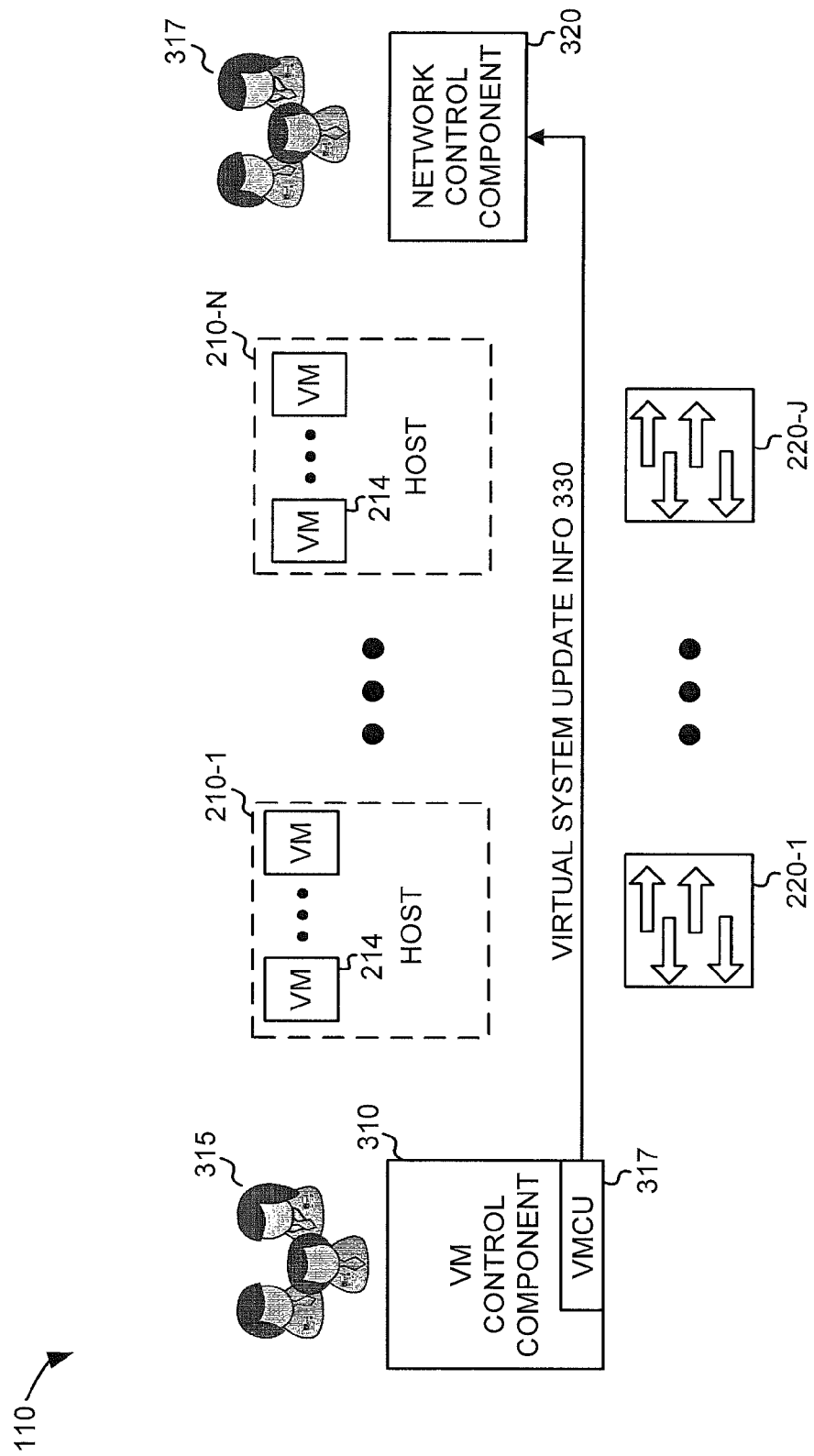
FIG. 3 is a diagram illustrating additional components of a data center.

FIG. 3 is a diagram illustrating additional components of data center 110. In FIG. 3, components relating to the control of data center 110 are particularly illustrated. As shown, data center 110 may include a VM control component 310 and a network control component 320.

VM control component 310 may be used to provision, monitor, and/or manage hypervisors 212 and VMs 214. VM control component 310 may provide a centralized platform through which system administrators 315 may manage the virtual environment implemented by VMs 214. For example, through VM control component 310, system administrators 315 may startup new VMs 214, shutdown VMs 214, pause VMs 214, or move VMs 214 between hosts 210. VM control component 310 may also provide status information indicating, for example, the current state or load of VMs 214 and hosts 210. Through VM control component 310, system administrators 315 may generally monitor and adjust the operational state of the virtual system (i.e., VMs 214) provided by data center 110.

VM control component 310 may include, or be associated with, logic to provide status updates to network control component 320, illustrated as VM change updater (VMCU) 317. VMCU 317 may transmit virtual system update information 330, describing the installation and configuration of, for example, hosts 210, virtual switches 212, and VMs 214, to network control component 320. In general, virtual system update information 330 may provide network control component 320 with any information needed to make network control component 320 "aware" of the system state, as implemented by VM2 214 and/or hypervisors 212. VMCU 317 may be implemented, for example, through application programming interfaces (APIs) provided for VM control component 310.

Network control component 320 may be used to manage the physical network implemented within data center 110, called the physical system herein. Through network control component 320, network administrators 317 may configure switches 220 and/or other network devices in data center 110. Network control component 320 may provide a policy-based solution for managing both physical and virtual networks. Network control component 320 may, for instance, communicate with switches 220 and transmit configuration information to switches 220. The configuration information may be in response to changes made to the virtual system, such as changes made to VMs 214. Network control component 320 may thus act to keep the physical system in synchronization with the virtual system.

VM control component 310 and network control component 320 may be implemented as software applications running on separate computing devices in data center 110 or on VMs 214. In one implementation, VM control component 310 may include the vCenter product, from VMWare Corporation. In this situation, hypervisors 212 may include the VMWare vSphere hypervisor and virtual switches 212 may include the VMWare vSwitch. In alternative implementations, virtualization products from other vendors may alternatively be used.

Although FIGS. 2 and 3 illustrate exemplary components of data center 110, in other implementations, data center 110 may include additional, fewer, different, or differently arranged components than those illustrated in FIGS. 2 and 3 and described herein. Alternatively, or additionally, one or more of the components shown in FIGS. 2 and 3 may perform functions described as being performed by other of the components shown in FIGS. 2 and 3.

Figure 4:
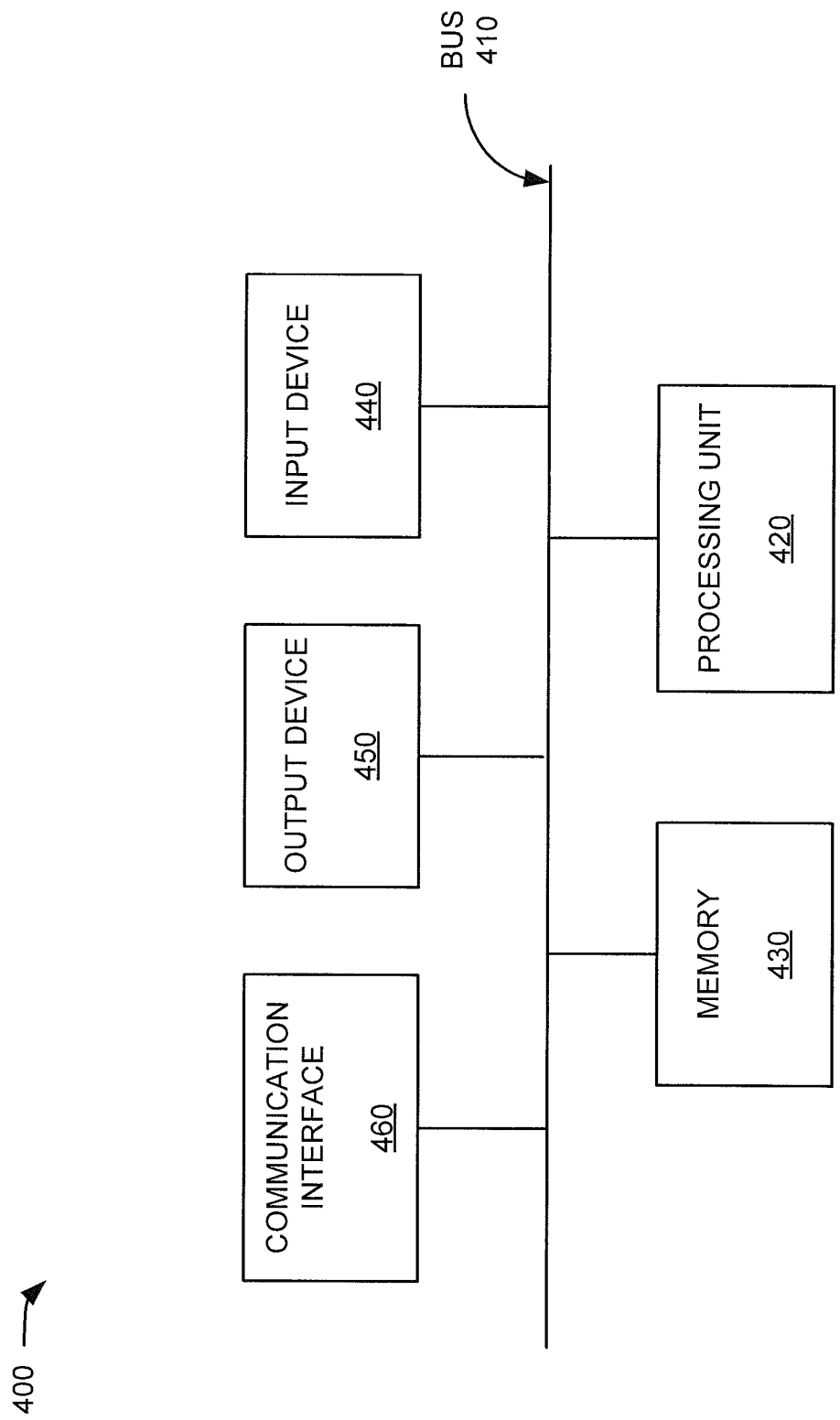
FIG. 4 is a block diagram of an example computing device.

FIG. 4 is a block diagram of an example computing device 400, which may correspond to a client device 105, a host 210, VM control component 310, and/or network control component 320. As illustrated, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. Additionally or alternatively, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include any transceiver-like mechanism that enables device 400 to communicate with other devices and/or systems. For example, communication interface 460 may include mechanisms for communicating with other devices.

As described herein, device 400 may perform certain operations in response to processing unit 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more tasks described as being performed by one or more other components of device 400.

Figure 5:
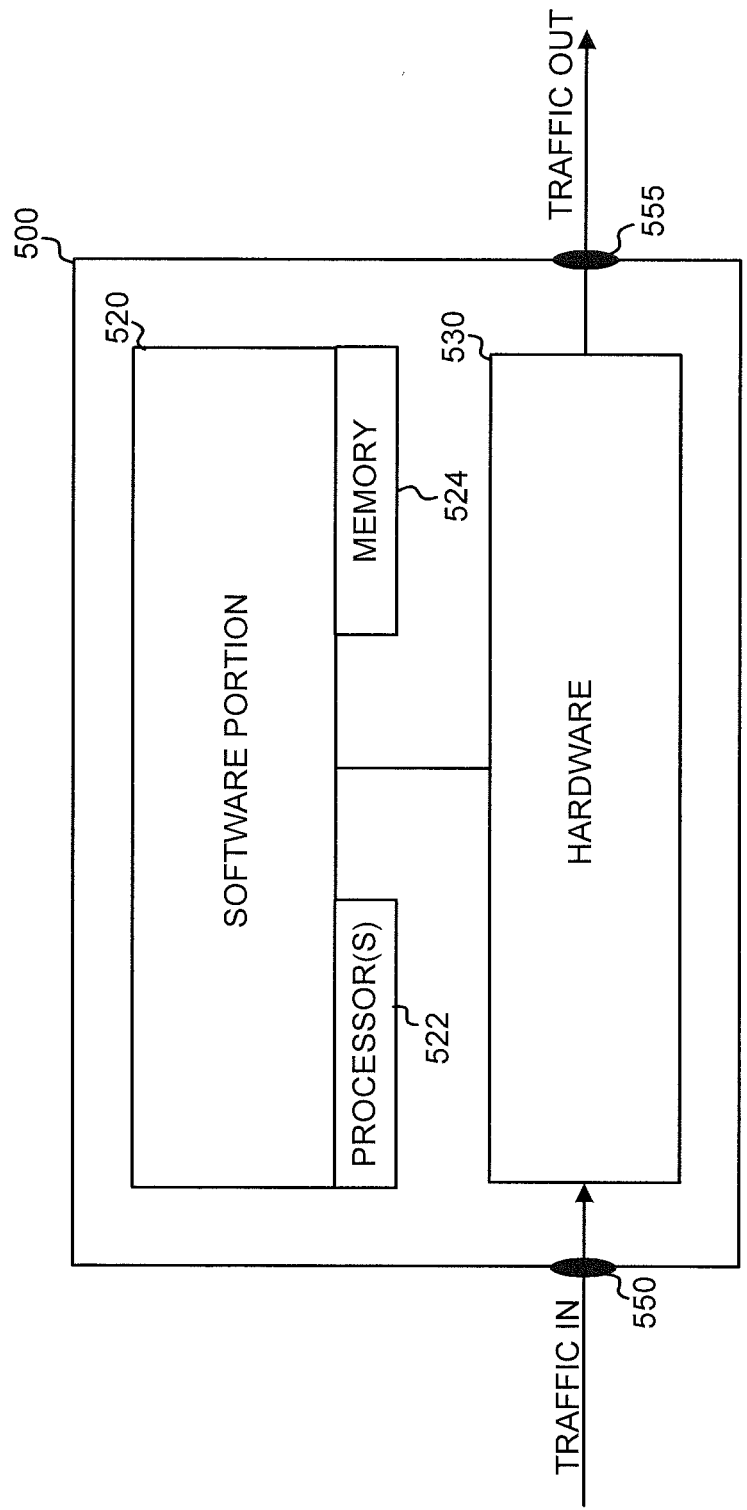
FIG. 5 is a block diagram of an example network device.

FIG. 5 is a block diagram of an example network device 500, which may correspond to one of switches 220. In order to increase throughput, network device 500 may use dedicated hardware to assist in processing incoming packets. As shown in FIG. 5, network device 500 may generally include a software portion 520 and a hardware portion 530.

Software portion 520 may include software designed to control network device 500. In general, software portion 520 may implement the functions of network device 500 that are not time critical. The functions described as being performed by software portion 520, may be implemented through, for example, one or more general purpose processors 522 and one or more computer memories 524. Processors 522 may include processors, microprocessors, or other types of processing logic that may interpret and execute instructions. Computer memories 524 (also referred to as computer-readable media herein) may include RAMs, ROMs, and/or other types of dynamic or static storage devices that may store information and instructions for execution by one or more processors 522. In general, software portion 500 may perform certain functions in response to processor(s) 522 executing software instructions contained in a non-transitory computer-readable medium, such as memory 524.

Hardware portion 530 may include circuitry for efficiently processing packets received by network device 500. Hardware portion 530 may include, for example, logic, such as an ASIC, a FPGA, and/or a content-addressable memory (CAM). When network device 500 is a router and/or switch, hardware portion 530 may receive incoming traffic, extract header information for the traffic, and process the traffic based on the extracted header information.

Network device 500 may additionally include one or more input ports 550 for receiving incoming network traffic (e.g., packets) and one or more output ports 555 for transmitting outgoing traffic. In some implementations, a port may act as both or one of an input port 550 or an output port 555.

Although network device 500 is shown as including a software portion 520 and a hardware portion 530, network device 500 may, in some implementations, be implemented entirely through hardware. Additionally, network device 500 may include additional, fewer, different, or differently arranged components than those illustrated in FIG. 5.

Figure 6:
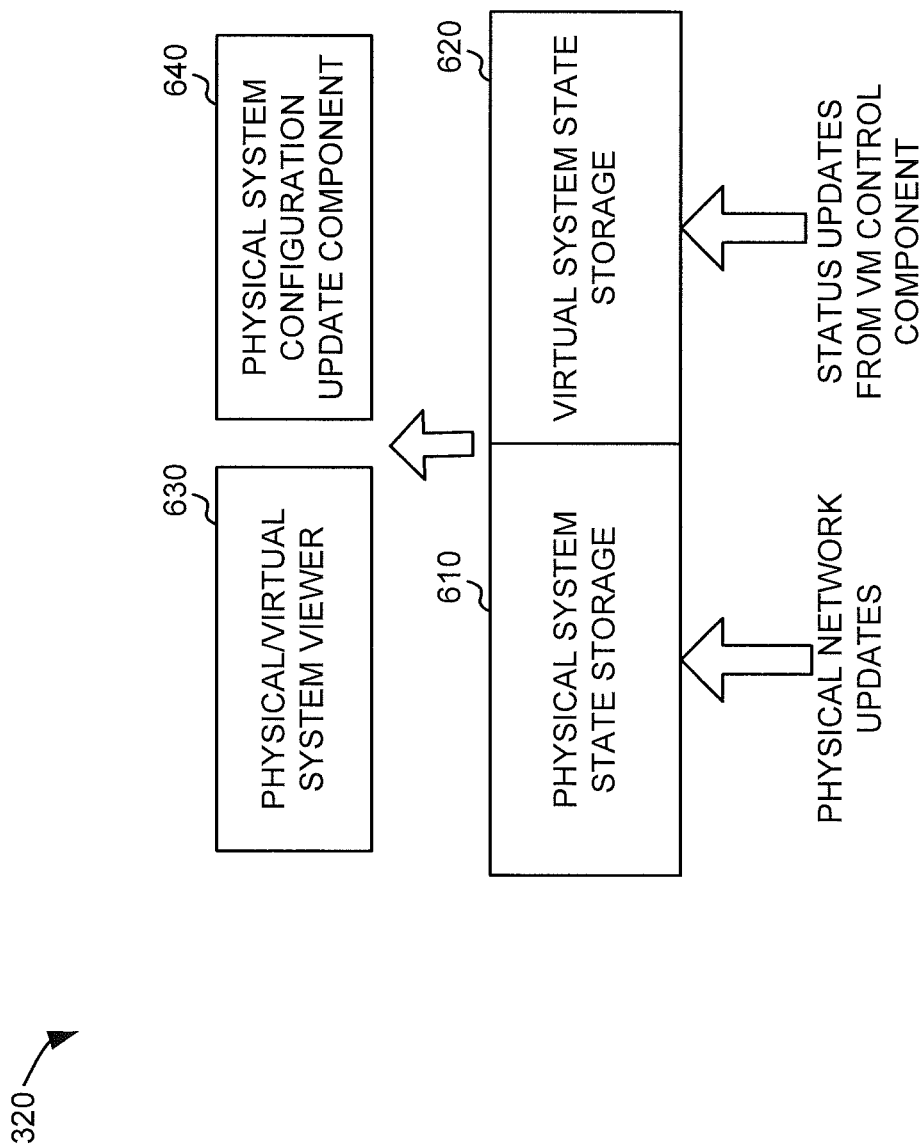
FIG. 6 is a diagram of example functional components of the network control component shown in FIG. 3.

FIG. 6 is a diagram illustrating an example of functional components of network control component 320. As shown, network control component 320 may include physical system state storage 610, virtual system state storage 620, a physical/virtual system viewer 630, and a physical system configuration update component 640.

Physical system state storage 610 may include logic to store information relating to the configuration and/or layout of the physical components of data center 110. Physical system state storage 610 may include one or more data structures that may store the number of installed switches 220 and hosts 210, the cabling layout between the installed switches 220 and/or hosts 210, configuration information relating to the installed switches 220 and/or hosts 210, or other information relating to the physical system of data center 110. The stored configuration information relating to switches 220 may include, for instance, VLANs that are allowed for each switch, forwarding information for the VLANs, QoS rules that are to be implemented by switches 220, security information, etc.

Physical system state storage 610 may be updated based on automatic updates from the devices of data center 110 (e.g., from switches 220) or through manual updating by an administrator 317. For example, network control component 320 may automatically query switches 220 for configuration information relating to switches 220, and/or may automatically transmit changes to switches 220 as the changes are made. Alternatively or additionally, updates to switches 220 may be made through network control component 320, which may thus correspondingly update physical system state storage 610.

Virtual system state storage 620 may include logic to store information relating to the configuration and/or layout of the virtual system (i.e., VMs 214, hypervisors 212, and/or virtual switches 216) of data center 110. Virtual system state storage 610 may include one or more data structures that may store the number of active VMs 214, performance information relating to the active VMs 214, host 210 upon which each active VM 214 is running, configuration information relating to virtual switches 216, or other information relating to the virtual system in data center 110. Virtual system state storage 620 may be updated based on virtual system update information 330, as received from VMCU 317. As previously mentioned, in one implementation, VMCU 317 may be implemented as programming instructions that conform to an API that is provided by the publisher of VM control component 310.

Physical/virtual system viewer 630 may include logic to present administrators, such as network administrators 317, with information describing data center 110. Because physical/virtual system viewer 630 has access to physical system state storage 610 and virtual system state storage 620, physical/virtual system viewer 630 may present a unified view of the operational state of data center 110, in which both the configuration and layout of the physical and virtual systems may be presented to network administrators 317.

Physical system configuration update component 640 may generally update the physical system in response to changes in the virtual system. In one implementation, network administrators 317 may place physical system configuration update component 640 in an automatic mode, called an orchestration mode herein. In the orchestration mode, physical system configuration update component 640 may automatically update the configuration of the physical system, such as switches 220, in response to changes in the virtual system. The operation of physical system configuration update component 640 will be described in more detail below with reference to FIGS. 7-9.

Although FIG. 6 shows example functional components of network control component 320, in other implementations, network control component 320 may contain fewer functional components, different functional components, differently functional arranged components, or additional functional components than depicted in FIG. 6. Alternatively, or additionally, one or more functional components of network control component 320 may perform one or more tasks described as being performed by one or more other functional components of device network control component 320.

Figure 7:
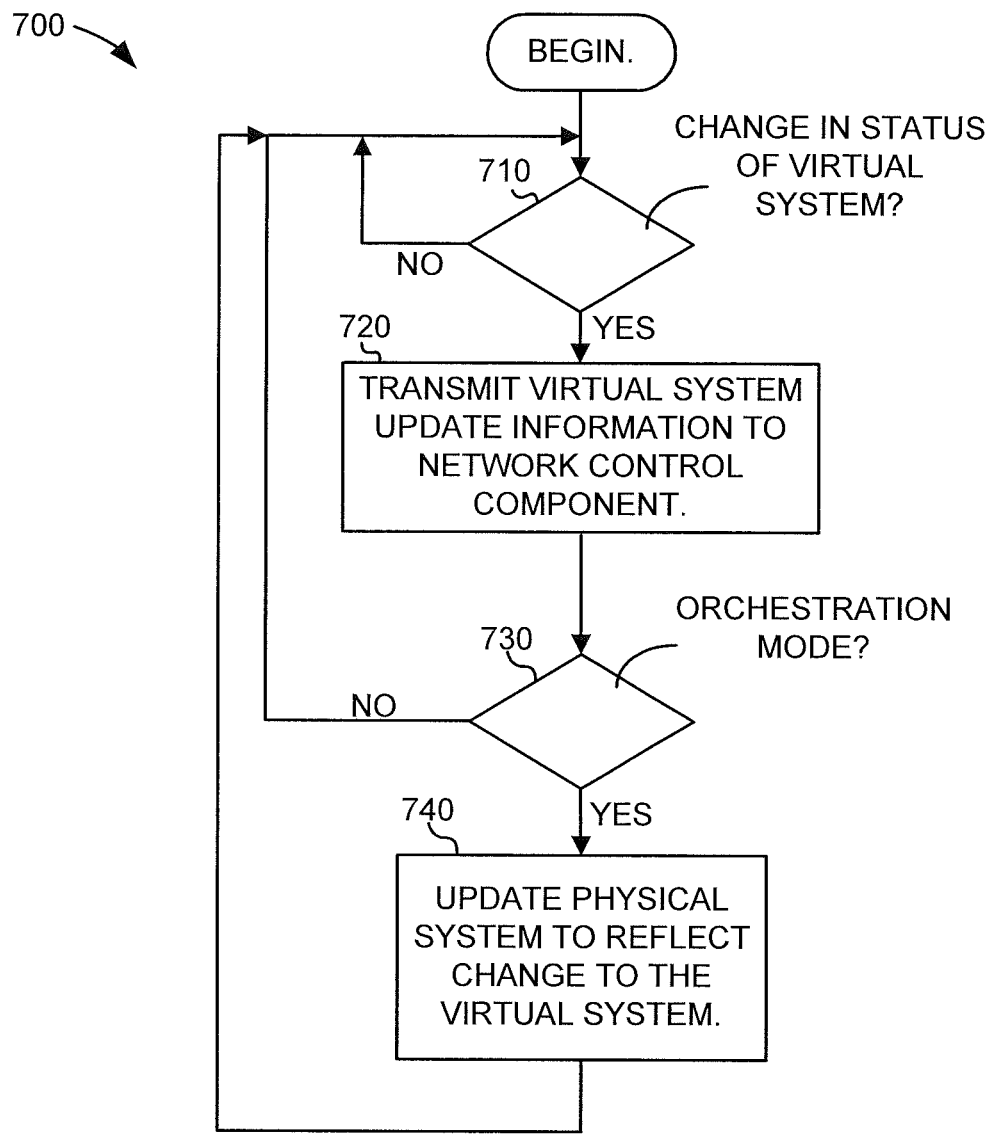
FIG. 7 is a flow chart illustrating an example process for operating a data center to synchronize virtual and physical systems.

FIG. 7 is a flow chart illustrating an example process 700 for operating data center 110 to synchronize the virtual system and the physical system.

Process 700 may include determining whether there has been a change in the status of the virtual system (block 710). VMCU 317 may, for example, receive changes to the status of the virtual system from VM control component 310. The changes to the virtual system may be the result of system administrators 315 reconfiguring VMs 214, changes due to failure of a virtual system, or other changes. For example, a system administrator 315, through VM control component 310, may move a VM 214 from one host 210 to another host 210.

When there is a change in the status of the virtual system, (block 710—YES), the information describing the change, such as virtual system update information 330, may be transmitted from VM control component 310 to network control component 320 (block 720). As previously mentioned, VMCU 317 may receive the update information describing the change and may transmit the update information to network control component 320. The update information may be stored in virtual system state storage 620.

Process 700 may further include determining if network control component 320 is in an orchestration mode (block 730). As previously mentioned, the orchestration mode may be a mode in which changes to the virtual system are automatically synchronized with the physical system. Whether network control component 320 is in the orchestration mode may be set by network administrators 317.

When network control component 320 is in orchestration mode (block 730—YES), network control component 320 may update the physical system to reflect the changes to the virtual system (block 740). Physical system update component 640 may, for instance, examine the changes to the virtual system and determine any configuration changes that need to be made to the physical system. In one implementation, physical system update component 640 may use heuristic techniques to determine the changes that need to be made to the physical system. The operation of physical system update component 640 is illustrated in more detail in the flow chart of FIG. 8.

Figure 8:
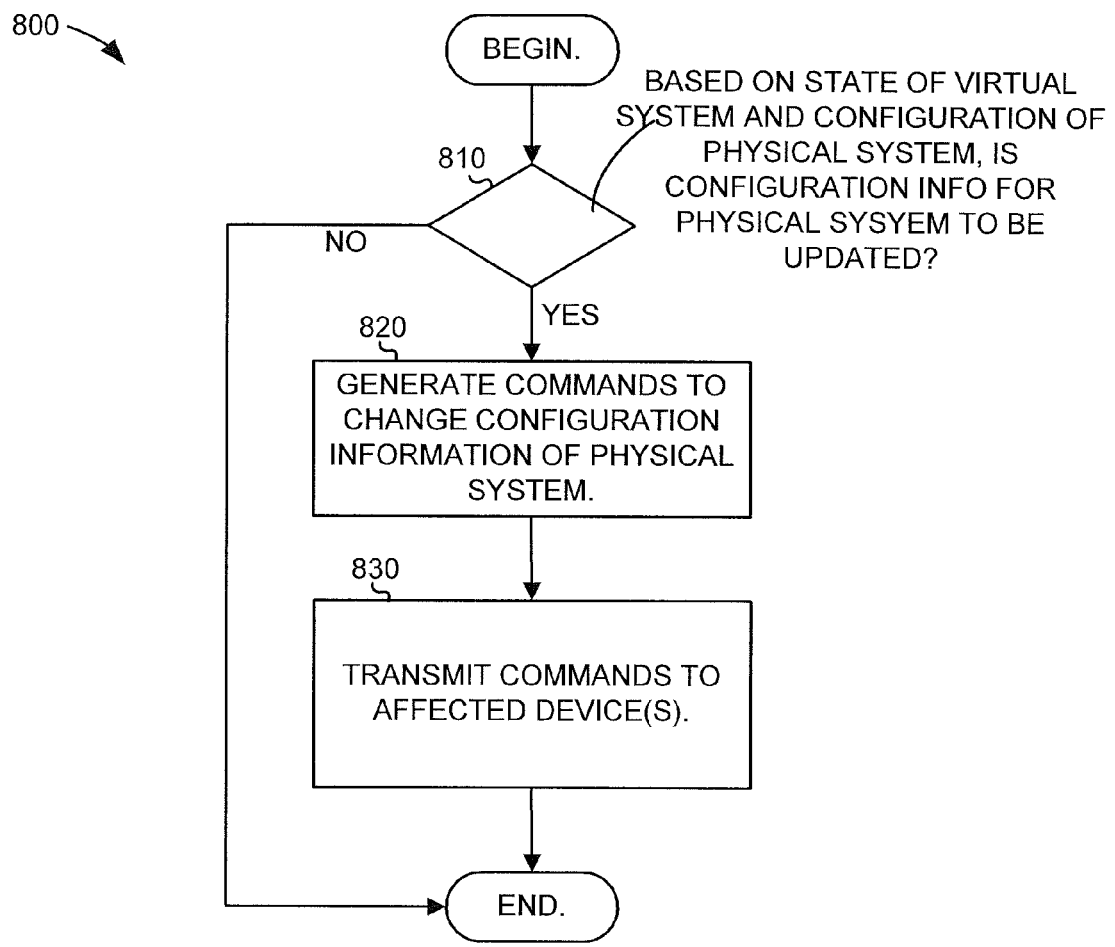
FIG. 8 is a flow chart illustrating an example process for updating a physical system to reflect changes in a virtual system.

FIG. 8 is a flow chart illustrating an example process 800 for updating the physical system to reflect changes in the virtual system. Process 800 may correspond to block 740 (FIG. 7).

Process 800 may include determining whether configuration information for the physical system should be updated (block 810). This determination may be made based on the state of the physical system and the virtual system (block 810). Physical system configuration update component 640 may, for instance, compare the changes to the virtual system to the state of the physical system, as stored in physical system state storage 610, to determine whether configuration information for the physical system should be updated. In one implementation, the comparison may be made using predetermined rules, in which, for example, certain changes in the virtual system may correspond to specific changes in the configuration information. For example, the movement of a VM 214, which is assigned to a particular VLAN, between hosts 210, may require that the port of physical switch 220 to which the new host is connected be configured to accept traffic from the particular VLAN.

Process 800 may further include generating commands to change the configuration information of the physical system (block 820). The configuration information of the physical system may be changed so that the physical system is compatible with the changed virtual system. In one implementation, the commands to change the configuration information may be text commands, such as commands that may be entered through a session initiated with the devices (e.g., switches 220) that are affected by the changes. For example, if a VLAN is to be added to a particular switch 220, one or more command line interface (CLI) commands may be used to add the VLAN to the particular switch 220. The CLI commands may include commands to, for example, set a description of the VLAN, set the name for the VLAN, set the subnet for the VLAN, etc.

In one implementation, the commands to change the configuration information of the physical system may be based on a template. A template may define a physical configuration that a device, such as a switch 220, supports. Predefined fields in the template may be changed to customize the template for a particular physical device. Physical system configuration update component 640 may select a template and fill out the fields of the template based on the information relating to the changed state of the virtual system.

Process 800 may further include transmitting the generated commands to the affected devices (block 830). In one implementation, physical system configuration update component 640 may remotely (i.e., over the LAN within data center 110) login to a device (e.g., a switch 220) and input the generated command. In this manner, the physical system may be automatically updated to reflect changes to the virtual system. Network administrators 317 may be relieved of the task of manually configuring the physical system when a change is made to the virtual system. As previously mentioned, in one implementation, the configuration changes relating to the physical system may include changes as to how VLANs are handled, QoS changes, security related changes, or other network policy related changes.

Figure 9:
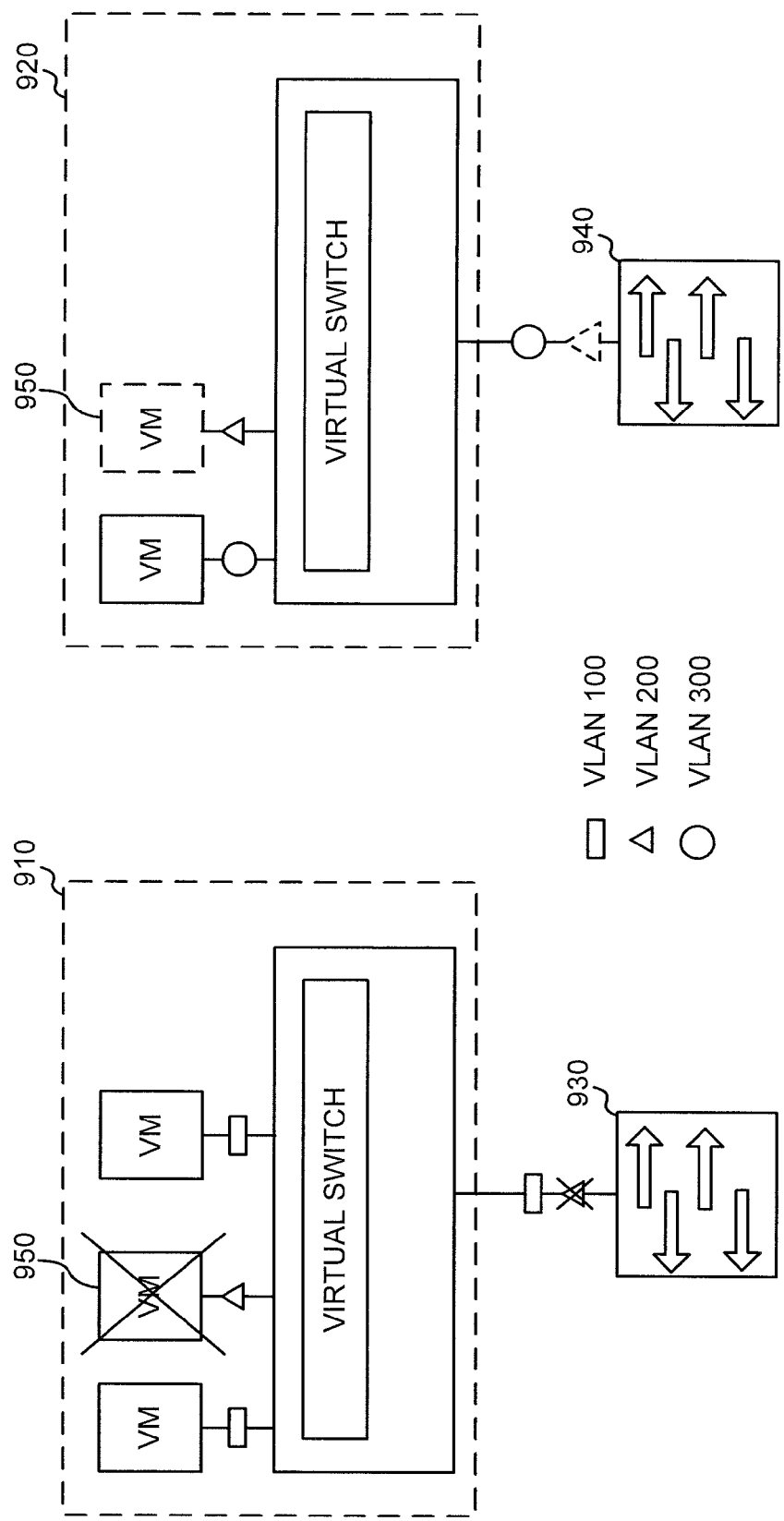
FIG. 9 is a diagram of an example configuration of a data center.

An example of the application of processes 700 and 800 will next be described with reference to FIG. 9. FIG. 9 is a diagram of an example data center similar to data center 110. In FIG. 9, two hosts 910 and 920, and two switches 930 and 940, are illustrated. Hosts 910 and 920 may include a number of VMs, each of which may be assigned to a VLAN. The VLANs are labeled as VLANs 100 (rectangles), 200 (triangles), and 300 (circles).

Assume that VM 950, which belongs to VLAN 200, is moved from host 910 to host 920 in response to a system administrator 315 initiating a move operation through VM control component 310. The move operation may generally include shutting down VM 950 at host 910, copying an image of VM 950 to host 920, and running the copied image at host 920. After the move operation, VM 950 may no longer be present at host 910 (shown crossed out in FIG. 9).

Switch 940, which did not switch traffic from VLAN 200 before the move operation, may need to be configured to accept traffic from VLAN 200. Similarly, after the move operation, host 910 may no longer include any VMs that are in VLAN 200. In this situation, the physical system that includes switches 930 and 940 may thus need to be updated to remove VLAN 200 from the port of switch 930 connected to host 910 and to add VLAN 200 to the port of switch 940 connected to host 920.

Physical system configuration update component 640 may receive the indication of the move of VM 950 to host 920. In response, physical system configuration update component 640 may determine that switch 940 may need to be reconfigured to allow the port that connects to host 920 to accept traffic from VLAN 200. Physical system configuration update component 640 may automatically connect to switch 940 and update the configuration information for switch 940. Similarly, physical system configuration update component 640 may reconfigure switch 930 so that the port that previously allowed traffic for VLAN 200, from host 910, no longer accepts traffic from VLAN 200. A system administrator 315 may move a VM between physical host devices and the underlying physical system may be automatically configured to handle the changes.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 8, the order of the blocks may be modified in other implementations. Moreover, non-dependent blocks may be implemented in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a device, information regarding changes made to one or more first virtual machines,
   a first physical device, of two or more physical devices, including:
      the one or more first virtual machines, and
      a virtual switch that connects the one or more first virtual machines to a first physical switch of one or more physical switches, a second physical device, of the two or more physical devices, including one or more second virtual machines, the first physical switch being associated with the first physical device and the second physical device, and the first physical switch handling traffic associated with the one or more first virtual machines in the first physical device;

determining, by the device, whether the information regarding the changes necessitates a change in a configuration of the one or more physical switches; and reconfiguring, by the device, when the information regarding the changes necessitates the change in the configuration of the one or more physical switches, affected ones of the one or more physical switches, to be in synchronization with the one or more first virtual machines.

2. The method of claim 1, where the information regarding the changes made to the one or more first virtual machines is received from an application that manages the one or more first virtual machines.

3. The method of claim 1, where the information regarding the changes made to the one or more first virtual machines includes information that describes movement of the one or more first virtual machines between the two or more physical devices.

4. The method of claim 1, where reconfiguring the affected ones of the one or more physical switches includes adding or removing virtual local area networks associated with the one or more physical switches.

5. The method of claim 1, where reconfiguring the affected ones of the one or more physical switches includes:
generating one or more commands to reconfigure the affected ones of the one or more physical switches.

6. The method of claim 5, where reconfiguring the affected ones of the one or more physical switches further includes:
inputting the generated one or more commands to the affected ones of the one or more physical switches through a remote session established with the one or more physical switches.

7. The method of claim 5, where generating the one or more commands includes completing fields of a pre-generated template.

8. The method of claim 1, further comprising:
maintaining information describing a state of the one or more first virtual machines; and
maintaining information describing a state of the two or more physical devices and the one or more physical switches.

9. The method of claim 8, further comprising:
presenting, to a user, and based on the information describing the state of the one or more first virtual machines and the information describing the state of the two or more physical devices and the one or more physical switches, a unified view of an operational state of a data center that includes the virtual system, the two or more physical devices, and the one or more physical switches.

10. The method of claim 1, where reconfiguring the affected ones of the one or more physical switches includes:
reconfiguring the affected ones of the one or more physical switches based on a quality of service policy configurations, security policy configurations, or virtual local area network membership configurations.

11. A non-transitory computer-readable medium storing instructions, the instructions comprising:
one or more instructions that, when executed by a processor, cause the processor to:

receive information regarding changes made to one or more first virtual machines, a first physical device, of two or more physical devices, including:
the one or more first virtual machines, and
a virtual switch that connects the one or more first virtual machines to a first physical switch of one or more physical switches, a second physical device, of the two or more physical devices, including one or more other virtual machines, the first physical switch being associated with the first physical device and the second physical device, and the first physical switch handling traffic associated with the one or more first virtual machines in the first physical device;

determine whether the information regarding the changes necessitates a change in a configuration of the one or more physical switches associated with the one or more first virtual machines; and reconfigure, when the information regarding the changes necessitates the change in the configuration of the one or more physical switches, affected ones of the one or more physical switches to be in synchronization with the one or more first virtual machines.

12. The non-transitory computer-readable medium of claim 11, where the information regarding the changes made to the one or more first virtual machines is received from an application that manages the one or more first virtual machines.

13. The non-transitory computer-readable medium of claim 11, where the information regarding the changes made to the one or more first virtual machines includes information that describes movement of the one or more first virtual machines between the two or more physical devices.

14. The non-transitory computer-readable medium of claim 11, where the one or more instructions to reconfigure the affected ones of the one or more physical switches include:
one or more instructions that, when executed by the processor, cause the processor to:
add or remove virtual local area networks associated with the one or more physical switches.

15. The non-transitory computer-readable medium of claim 11, where the instructions further include:
one or more instructions that, when executed by the processor, cause the processor to:
maintain information describing a state of the one or more first virtual machines; and
maintain information describing a state of the two or more physical devices and the one or more physical switches.

16. A system comprising:
a plurality of servers;
a plurality of physical switches;
a virtual machine control component; and
a network control component,
a particular server, of the plurality servers, including:
one or more virtual machines, and
a virtual switch that connects the one or more virtual machines to a particular physical switch of the plurality of physical switches,
the particular physical switch being associated with one or more servers of the plurality of servers,
the one or more servers including the particular server, the particular physical switch handling traffic associated with the one or more virtual machines in the particular server, the virtual machine control component being to:
provision the one or more virtual machines,
manage the one or more virtual machines, and
transmit information regarding changes made to the one or more virtual machines, and the network control component being to:
manage the plurality of servers and the plurality of physical switches,
receive the information regarding changes made to the one or more virtual machines,
determine whether the information regarding the changes necessitates a change in a configuration of one or more physical switches, of the plurality of physical switches, associated with the one or more virtual machines,
the one or more physical switches including the particular physical switch, and
reconfigure, when the information regarding the changes necessitates the change, affected ones of the one or more physical switches to be in synchronization with the one or more virtual machines.

17. The system of claim 16, where the one or more virtual machines include virtual database servers, web servers, or email servers.

18. The system of claim 16, where the particular server further includes a hypervisor to control the one or more virtual machines.

19. The system of claim 16, where the information regarding the changes made to the one or more virtual machines includes information that describes movement of the one or more virtual machines between the plurality of servers.

20. The system of claim 16, where, when reconfiguring the affected ones of the one or more plurality of physical switches, the network control component is to:
reconfigure the affected ones of the one or more plurality of switches by adding or removing virtual local area networks associated with the one or more plurality of switches.

21. The system of claim 16, where the network control component is further to:
maintain information describing a state of the one or more virtual machines; and
maintain information describing a state of the plurality of physical switches.

22. The non-transitory computer-readable medium of claim 11, where the one or more instructions to reconfigure the affected ones of the one or more physical switches include:
one or more instructions that, when executed by the processor, cause the processor to:
generate one or more commands to reconfigure the affected ones of the one or more physical switches, and
input the one or more commands to the affected ones of the one or more physical switches through a remote session established with the one or more physical switches.

* * * * *